(12) United States Patent
Pilgrim

(10) Patent No.: US 9,077,868 B2
(45) Date of Patent: Jul. 7, 2015

(54) METHOD AND DEVICE FOR VIEWING THROUGH FOG

(76) Inventor: Robert Pilgrim, Benton, KY (US)

( * ) Notice: Subject to any disclaimer, the term of this patent is extended or adjusted under 35 U.S.C. 154(b) by 471 days.

(21) Appl. No.: 13/385,635

(22) Filed: Feb. 28, 2012

(65) Prior Publication Data

US 2012/0224061 A1    Sep. 6, 2012

Related U.S. Application Data

(60) Provisional application No. 61/464,388, filed on Mar. 3, 2011.

(51) Int. Cl.
*H04N 7/18* (2006.01)
*B60R 1/00* (2006.01)

(52) U.S. Cl.
CPC *H04N 7/183* (2013.01); *B60R 1/00* (2013.01); *B60R 2300/205* (2013.01); *B60R 2300/30* (2013.01)

(58) Field of Classification Search
CPC ............. B60R 1/00; B60R 2300/105; B60R 2300/806; B60R 2300/305; H04N 7/18
USPC .......................................................... 348/148
See application file for complete search history.

(56) References Cited

U.S. PATENT DOCUMENTS

| 7,561,255 B1 * | 7/2009 | Billmers et al. ............. 356/5.04 |
| 8,184,270 B1 * | 5/2012 | Billmers et al. ............. 356/5.04 |
| 2003/0048499 A1 * | 3/2003 | Alfano et al. ................ 359/110 |

* cited by examiner

*Primary Examiner* — Dave Czekaj
*Assistant Examiner* — Berteau Joisil
(74) *Attorney, Agent, or Firm* — Chris Tanner, Esq.; TannerPatent.com

(57) ABSTRACT

A method and device for viewing objects situated in fog is disclosed. An optical system directs light from a scene onto a detector array through one or more optical waveband limiting filters. The detector array transfers a succession of captured scene images to an electronic device for processing. These processed images are transferred to a display device. A method and device for demonstrating the inventive optical system is presented.

20 Claims, 8 Drawing Sheets

METHOD AND DEVICE FOR VIEWING THROUGH FOG

CROSS REFERENCE TO RELATED APPLICATIONS

This application claims prior to U.S. Provisional Application No. 61/464,388, filed on Mar. 3, 2011, the entire contents of which are hereby incorporated by reference.

BACKGROUND OF THE INVENTION

The embodiments disclosed herein relate generally to methods and devices used to enhance the quality of images of objects in obscured environments. It is known in the art that photonic detectors have a dynamic range that is much less than the range of light levels that are directed onto them in typical optical imager applications. It is standard practice to use gain control to set the sensitivity of the detectors based on the brightest light levels being detected. This involves the use of an electronic processor to analyze the signals generated by the detectors and to adjust the detector sensitivities to achieve a discernible response to a particular average signal level from an ensemble of detectors. Once the electronic gain has been set, this determines the minimum light level signal to which the detectors will respond. For this gain setting, variations in the scene light levels below this minimum are not detectable.

Selecting pass band filters to increase signal to background clutter ratios, taking advantage of known detector types and the exploitation of available optical materials are known in the art. Popular electromagnetic pass bands such as those referred to as visible (VIS), near-infrared (NIR), and thermal have become standards in industry. System components based on these standards are commonly available and are widely used in the development of non-imaging and imaging electro-optical systems. In common practice other pass bands have been overlooked or actively avoided due to the presence of absorption bands by atmospheric constituents such as O2, NO2 and H2O. Pass band filters, optical systems and detectors are designed to utilize spectral regions that exclude these absorption bands. A typical use of a pass-band filter might be to block unwanted bands, thereby making it easier to amplify a desired band or bands. The embodiments disclosed herein do not work this way. Instead, the embodiments disclosed herein take advantage of the fact that the H2O absorption band (e.g. fog) admittedly blocks some light, but also absorbs other portions of scattered light. The embodiments disclosed herein focus on taking advantage of these absorbed portions, in order to more effectively view an image in an environment where fog is present.

DESCRIPTION OF THE PREFERRED EMBODIMENTS

Figure 1:
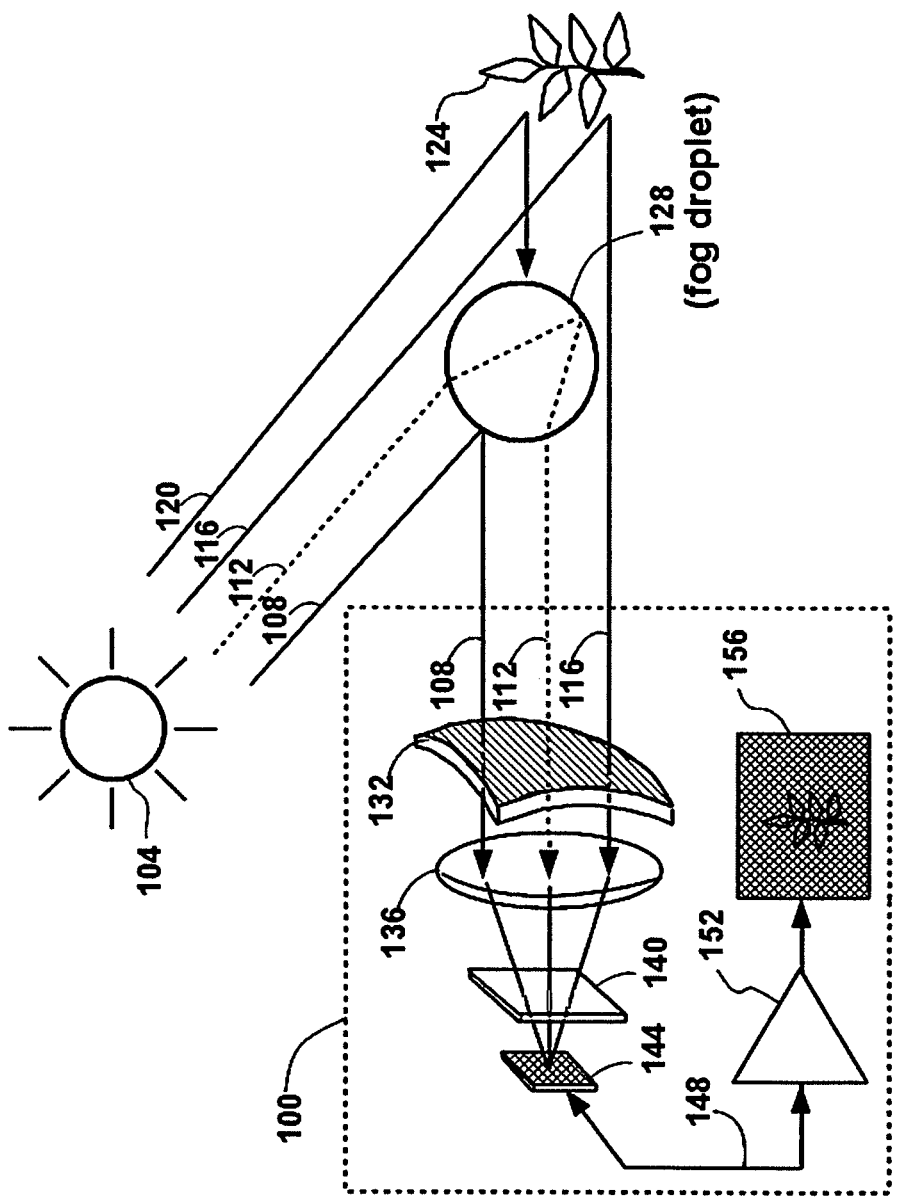
FIG. 1 is a diagram giving an overview of the phenomenology being exploited, the essential elements of the device and its preferred embodiment.

A method and device for viewing objects situated in fog. An optical system directs light from a scene onto a detector array through one or more optical waveband limiting filters. The pass band of the filter(s) reduces the amount of light scattered from the droplets of fog shifting the effective dynamic range of the lightest to the darkest portions of the image so that the detectors can provide detectible contrast between the objects being viewed compared with the background. The detector array transfers a succession of captured scene images to an electronic processor which further increases the contrast ratio between the object and background. These processed images are transferred from the electronic processor to a display device.

The present embodiments take advantage of the absorption bands in water to reduce the amount of scattered light reaching the focal plane of an optical imaging device, thereby increasing the visibility of objects situated in fog and other sources of water vapor when viewed in natural or artificial light. Much of the scattered light that is in the spectral region corresponding to the absorption band of water is absorbed by the fog before it can reach the focal plane of the optical system. Natural or artificial light in the regions of the spectrum outside the absorption band are scattered off the surface of the fog droplets and would normally reach the focal plane, essentially blinding the sensor to objects reflecting less light. In the present embodiment this light is blocked by pass band filters. The reduction in the amount of scattered light energy reaching the focal plane permits the shifting of the dynamic range of the detector/amplifier circuitry to a level that includes the variations in light level presented by objects of interest in the scene.

In the preferred embodiments, one or more bandpass filters are used to block all wavelengths of light except for those corresponding to the absorption bands of water. These filters can be placed in front of, behind or between the lenses comprising the optical system, or the multilayer filter coatings can be applied directly to the lenses themselves as well as any other surface in the optical path.

In particular embodiments the filters can be comprised of multilayer coatings applied to flat optical surfaces. The use of multilayer bandpass filters requires that band limits are chosen to ensure the shift in the pass band due to changes in the angle of incidence (AOI) does not result in the pass band being shifted out of the absorption band for which it is designed.

In other embodiments, the multilayer coating are applied directly to the surfaces of one or more of the lenses of the optical system. As with the previous embodiment the band limits are selected to remain in the selected absorption band at the widest field-of-view (FOV) of the optical system.

In other embodiments, the bandpass filters are constructed using a combination of neutral density or absorption filters whose transmission limits are intrinsic properties of the filter material. An example of such filters are the chalcogenide glasses, some of which block visible light in preference to near infrared (NIR) light. Using neutral density and other absorption filters eliminates the issue of pass band shift at extreme FOV limits, while the edges of the band limits are spread over a larger spectral range. In other embodiments, a combinations of multilayer and absorption filters are used to shape the desired pass band while mitigating the effects of band shift with changing AOI.

Finally in other embodiments the optical system and detector are of a non-imaging type in which objects being detected are illuminated with natural (passive) or artificial (active) light sources. In these embodiments the pass band selection is potentially further limited by the specific spectral characteristics of the illumination itself.

Now referring to the drawings, FIG. 1 shows an diagrammatic overview of the preferred embodiment 100, in use. A source of light 104 illuminates the scene including the object (s) of interest 124. A portion of the light strikes the fog water droplets 128. Approximately 3% 108 is reflected off the surface of the droplets while the remaining 97% 112 is refracted into the droplet and is absorbed or reemerges from the droplet in some direction. The fraction that is absorbed and the fraction that emerges depends on the wavelength of the light and the extinction (absorption) properties of water at that wavelength. Another portion of the light 116 is reflected off the scene objects of interest 124 and is directed toward the optical system. Another portion of the light 120 is reflected off the scene objects and then strikes one or more of the fog water droplets. The proportion of light 116 reflected off the scene objects that reaches the entrance aperture of the imaging device and the proportion that eventually strikes a water droplet 120 depends on the density of the fog and the path length of the light rays through the fog. The utility of the present embodiment benefits from the fact that water droplets in fog are well separated and occupy a very small fraction of the volume they occupy.

In an exemplary embodiment, a bandpass filter 132 is situated before the lens system 136 of the imaging device. Alternately a bandpass filter 140 is situated after the lenses in the optical train on or near the focal plane 144. In another embodiment the multilayer coating is applied directly to the surface of one or more of the lenses 136 of the optical system. The focal plane 144 is an array of detectors responsive to the electromagnetic energy passing through the filter. In a non-imaging embodiment the focal plane is comprised of a single detector to generate a signal proportional to the amount of incident light. In all embodiments the filter preferentially passes the wavelengths of light corresponding to the absorption bands of water. Within the detector or the detector array the electromagnetic energy is converted to electrical signals. These detectors have a dynamic range that is typically much less than the range of light levels in the scene to be imaged. Standard methods of electronic gain control are used to set the dynamic range of the detectors. By limiting the filter, pass band to that of the absorption band of water, a large amount of scattered light is eliminated, thus reducing a major contributor to the obscuration effects of fog. The electrical signals emanating from the detectors are transferred by an appropriate line of communication 148 to an electronic processor 152. This processor uses standard signal conditioning and/or image processing methods such as histogram expansion to increase the contrast ratio of portions of the image corresponding to light levels presented by the objects of interest while reducing the contrast ratios of other portions of the image. The electronic processor 152 uses the line of communication 148 to adjust the gain of the detectors based on the perceived light levels reaching the focal plane. In the preferred embodiment, the images are displayed on a standard monitor 156.

Figure 2:
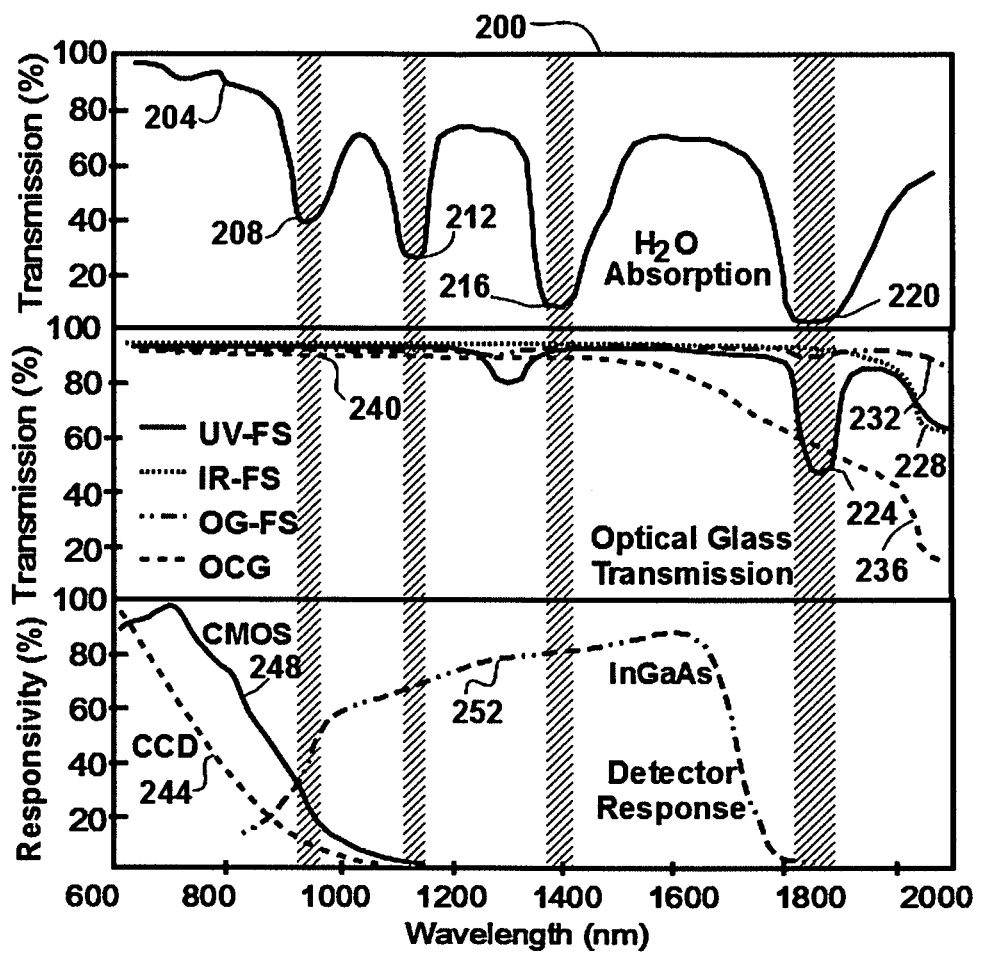
FIG. 2 is a composite of spectrograms in the range of 600 to 2100 nanometers showing the absorption bands for H2O, the transmission of popular optical materials and the relative responsivities of selected electromagnetic detectors.

FIG. 2 is a composite of the absorption spectra of water, the transmission spectra of popular lens making materials and the relative responsivities of photonic detectors useful in the spectral range of 600 nm to 2100 nm. FIG. 2 is a composite of spectrograms to review the spectral elements of the preferred embodiments. In the topmost spectrogram of 200 the percentage transmission through 100 meters of moderate fog 204 shows four significant absorption bands 208, 212, 215, and 220. The approximate bandwidth of the first absorption band 204 is 925 nm to 975 nm. The bandwidth of the second absorption band 212 is 1115 nm to 1150 nm. The bandwidth of the third absorption band 216 is 1380 nm to 1410 nm. The bandwidth of the fourth absorption band 220 shown in this spectral range is 1810 nm to 1895 nm.

In the middle spectrogram of 200 the percentage transmission of popular optical glasses in the spectral regions pertinent to the present embodiment are shown. The transmission of ultra-violet fused silica (UV-FS) 224 is shown to be a compatible candidate lens material for embodiments that exploit the first three absorption bands described in the previous paragraph. The transmission of infrared fused silica (IR-FS) 228 confirms that lenses manufactured using this material are applicable to all four absorption bands. Similarly, the transmission spectrum of optical-grade fused silica (OG-FS) 232 show that this material supports embodiments for all four absorption bands. The transmission of optical crown glass (OCG) 236, shows that it offer slightly degraded performance for all absorption bands pertinent to the present embodiment and that it is inadequate for the fourth absorption band.

The bottom spectrogram of 200 compares the relative responsivity of three types of photonic detectors at ambient temperature (i.e. uncooled). These are silicon charge-coupled devices (CCDs) 244, capacitive couple metal-oxide semiconductor (CMOS) devices 248, and indium-gallium-arsenide (InGaAs) devices 252. The present embodiments use photonic detectors that are responsive in the spectral region of their respective targeted absorption bands. Since standard practice in the design and development of VIS-NIR imagers has been to avoid or ignore the electromagnetic spectral regions of the absorption bands of water, the number of detectors responsive to this region are limited. Depending on the particular application, the relative costs and availabilities of detector arrays affect the choice of detector type. For the embodiments exploiting the first absorption band 208, the three aforementioned detector types provide adequate responsivity. Due to the relatively lower costs, the CCD 244 or the CMOS 248 detector types are selected for a preferred embodiment.

Figure 3A:
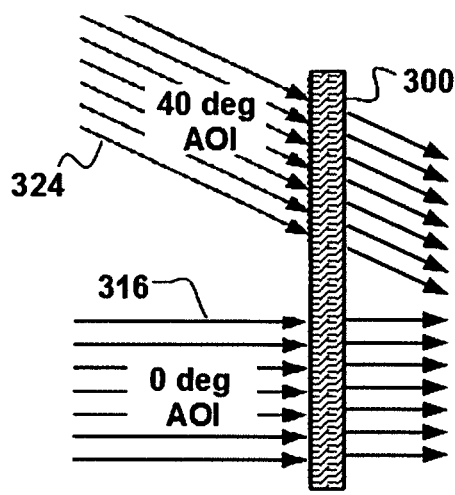
FIG. 3A is an illustration of a multilayer bandpass filter with light passing through it normal to the surface of the filter and at an angle of incidence (AOI) of 40 degrees off of normal.

FIG. 3A is an illustration of the range of angles of incidence of light passing through the multilayer pass band filter 300, of the preferred embodiments. When incident light has an angle of incidence (AOI) of 0 (zero) degrees 316 the pass band is at its longest wavelength. The AOI of 40 degrees 324, is at the limit of the field-of-view of a preferred embodiment.

Figure 3B:
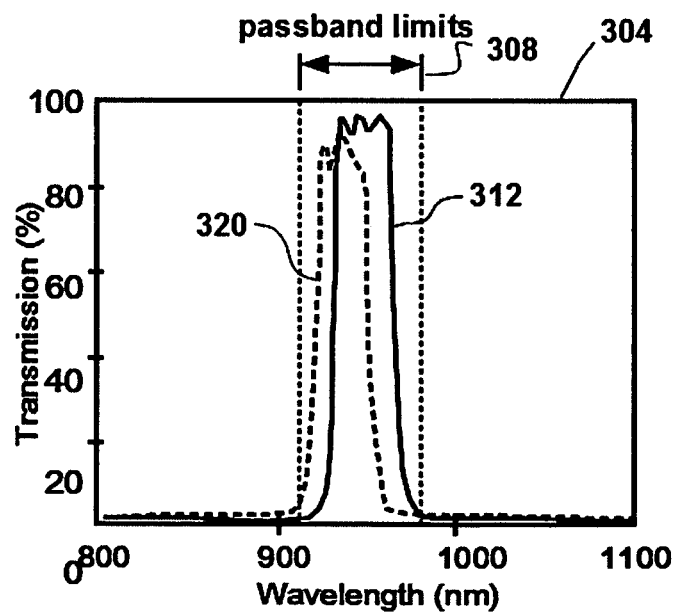
FIG. 3B is a spectrogram showing the shift in the pass band due to light rays passing through it at an oblique angle of incidence (AOI)

FIG. 3B Is a spectrogram 304 showing the spectral effects of changes in the angle of incidence (AOI) of incoming light. Multilayer bandpass filters are comprised of alternating layers of high and low refractive index materials. The number and thickness of these layers are selected to determine the wavelength of the pass band and the bandwidth. As a demonstration of the design method of a preferred embodiment, we use the absorption band for water in the band 910 nm to 975 nm. In this example, the pass band 312 is centered on 950 nm with a full bandwidth of approximately +/−25 nm. The pass band for 0 degree AOI light 312 is designed to be far enough from the edges of the absorption pass band limits 308 that the shift in pass band at the widest AOI for the application (such as 40 degrees) 320 remains inside the pass band limits. The shift in pass band center between an AOI of 0 degrees and an AOI or 40 degrees is approximately 15 nm. The longer wavelength of the bandpass filter is determined by the longer wavelength edge of the absorption band. The shorter wavelength of the bandpass filter is determined by the shorter wavelength edge of the absorption minus the maximum shift in wavelength set by the maximum field of view limit. For the exemplary embodiment in FIG. 1 in which the bandpass filter 132 is placed in front of the entrance aperture of the optical system, its location and shape can be chosen to reduce the amount of shift with changing AOI. One such embodiment for the filter is a spherical shell positioned such that the center of the radius of curvature of the shell is placed at the entrance aperture of the optical system.

Figure 4:
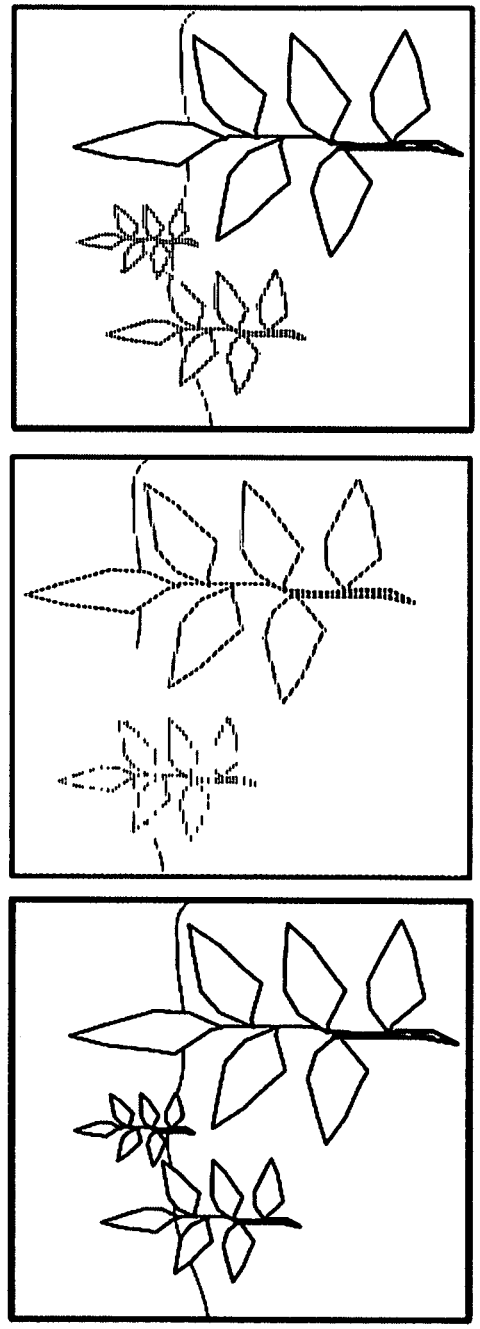
FIG. 4 is an illustration of the effects of fog on the ability to see distant objects and the typical improvement in viewing using the present embodiment.

FIG. 4 illustrates a typical application in which an embodiment is used to view a scene. In 400 we see the scene without fog showing objects at varying ranges. In the presence of fog 404 scattered light from the fog droplets obscures the view of all but the closest objects in the scene. This is partly due to transmission losses caused by light interaction with the fog itself and partly due to scattered light off the surfaces of the fog droplets. In 408 we see the effect of reducing the effects of scattered light. Overall viewing quality is reduced compared to the same scene and viewing scenario of 400, but an improvement over the unaided view of 404.

Figure 5:
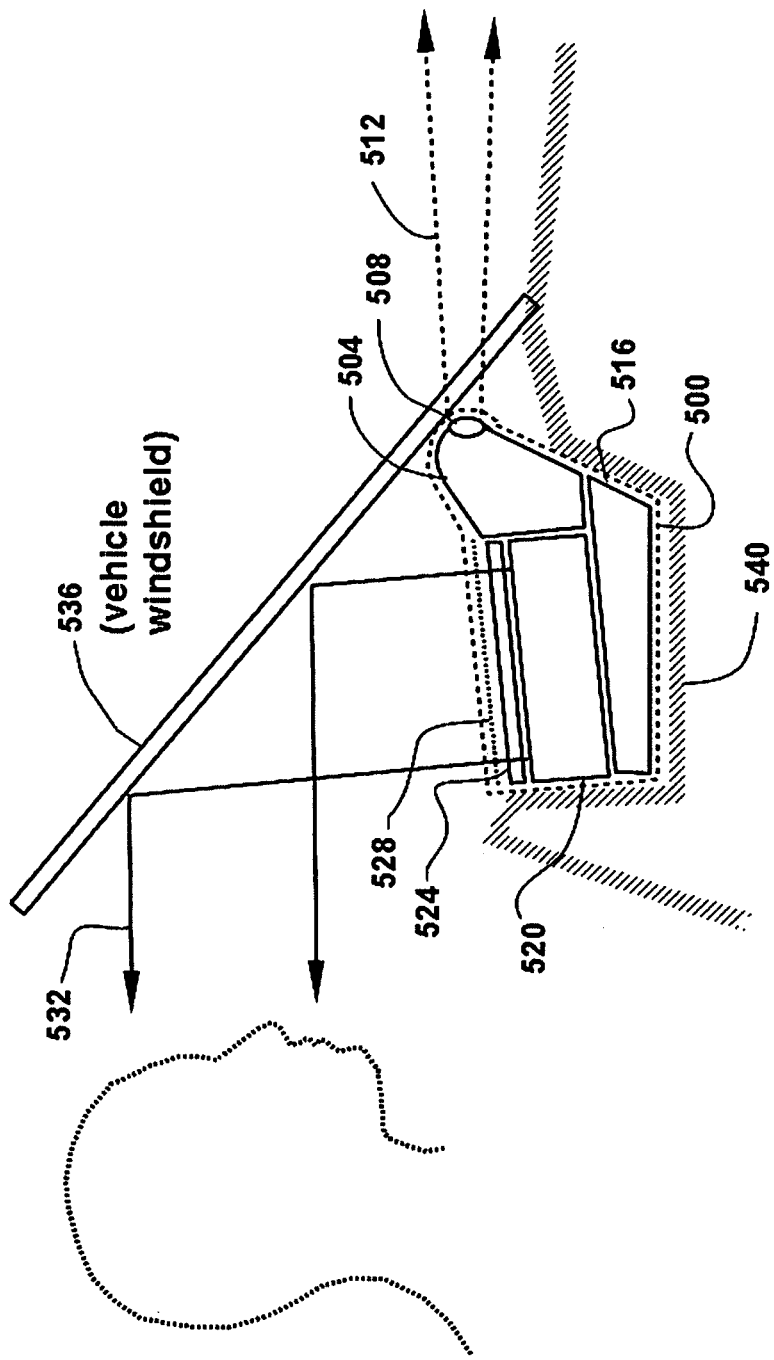
FIG. 5 is a side view illustration of an application of an embodiment as a heads-up display for a vehicle.

FIG. 5 gives a side-view of another embodiment of the device and method 500 providing a heads-up display for the driver or passenger reflected off a vehicle windshield 532. The optical system 504 can be located anywhere that its entrance aperture has an unobstructed view of the scene ahead 512. The optical system passes the images to the electronics processor 516 for further contrast enhancement. In this application the magnification presented by the display 520 and the field-of-view set by the optical system 504 must be calibrated so that the image presented to the viewer is a one-to-one match with the direct view through the windshield. To give the viewer the impression that the reflected scene is actually at the normal range of directly viewed objects an optical collimating lens 524 may be included. Windshields are usually not flat so that images reflected off them may be affected. In such cases a corrective lens 528 designed to correct for a matching windshield may be used so that images reaching the eye of the viewer 532 will be match the direct view. In some vehicle the design and shape of the dash 540 may be modified to accept the entire system as a self-contained unit. In another embodiment components other than the video display module may be located at other locations about the vehicle.

Figure 6:
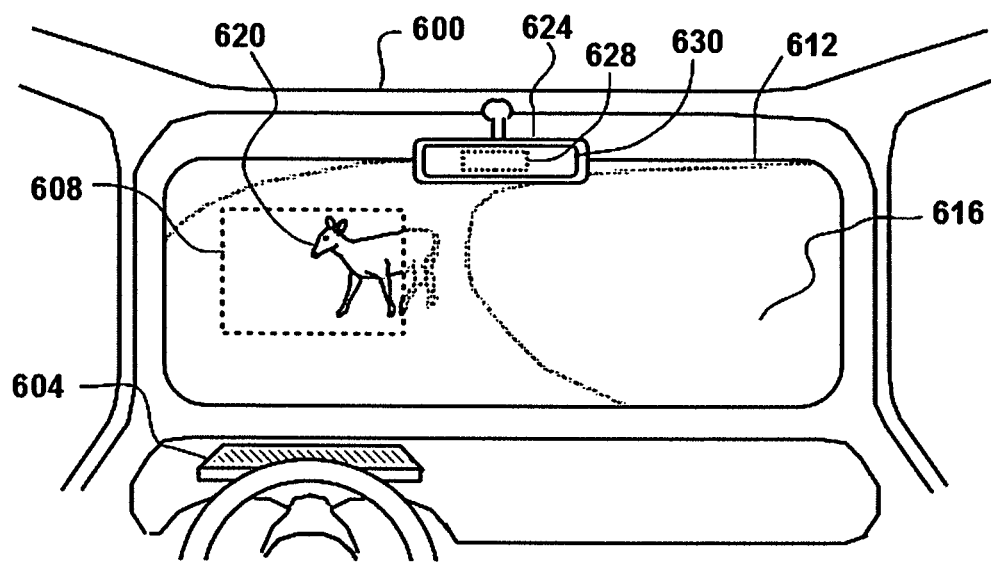
FIG. 6 is an illustration of an application of an embodiment as a heads-up display as viewed through the windshield of the vehicle.

FIG. 6 illustrates a view presented by the heads-up display from inside the passenger compartment 600 of a ground vehicle. The video display module 604 containing the video monitor, the collimating lens and the corrective lens displays a collimated view 608 reflected off the windshield 612 is shown placed on or in the dash in front of the driver providing improved viewing in a foggy scene 616. The properly calibrated collimated image 608 matches the location and size of objects 620 in the direct view. In another embodiment a rear-viewing camera and filter module provides a view in a rear-view mirror 624 through a partially reflecting portion 628 of the rear-view mirror 630.

Figure 7:
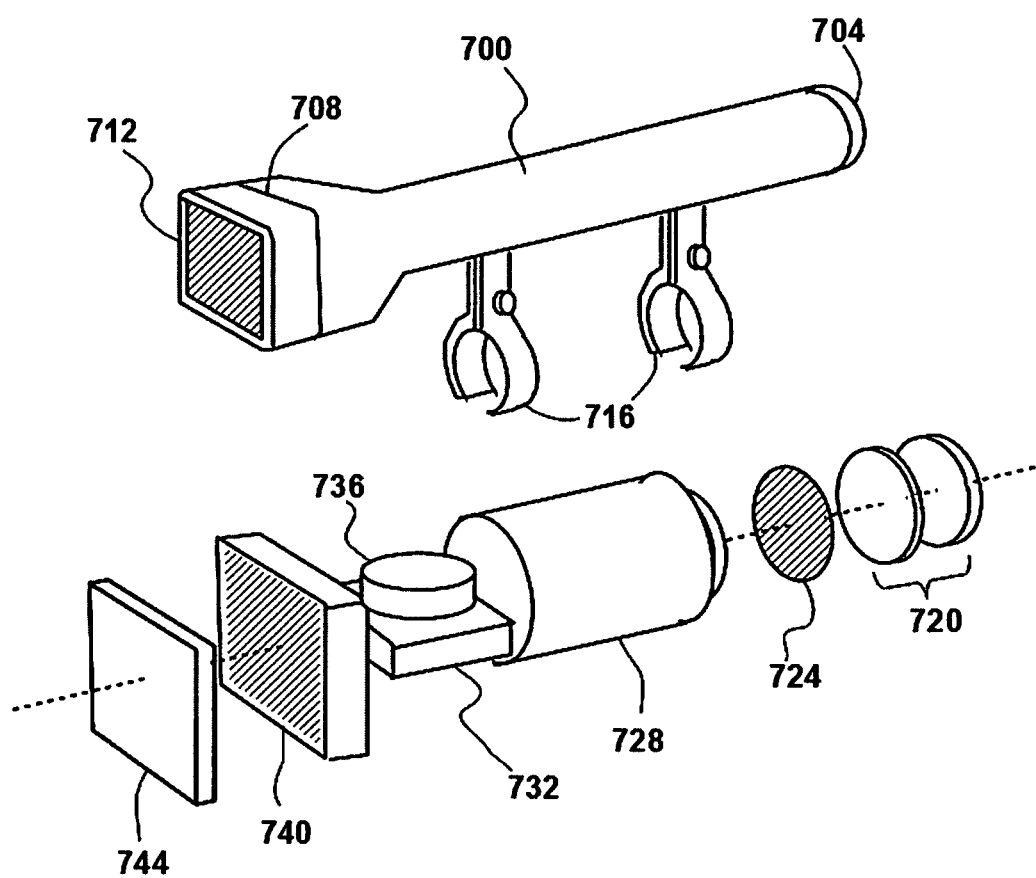
FIG. 7 is an illustration of an application of an embodiment as a gun sight.

FIG. 7 is another embodiment of the device and method as a magnified optical sight or rifle scope 700. The optical system entrance aperture 704 has its optical axis aligned with the bore-sight of the weapon. The video display unit 708 is equipped with a collimating lens with reticle and other elements support the primary purpose of the sight. The video display may be reoriented or detached to provide for easier viewing. A variety of means of attaching the sight to weapons may require interchangeable attachment mechanisms 716. In embodiments involving telephoto optical elements 720 the variation in AOI will be much less. Therefore the amount of shift in the pass band of the multilayer optical filter 724 will be less due to the reduced field-of-view limits for telephoto lens systems. As a result the pass band limits are made wider permitting a greater amount of light to be passed to the focal plane, to compensate for the reduced amount of light passing into the telephoto optical system. The focal plane and associated electronics 728 are modified to match the limited field-of-view, reduced light level and extended depth-of-field of the telephoto lens system. The contrast enhancement functions of the electronics processor 732 are embedded in a low-power micro-controller to reduced power consumption. The battery power supplies 736 are centrally located for easy access to the camera unit, electronics processor/micro-controller and the video display 740. An adjustable focus collimating optical element 744 is situated between the video display unit and the user.

Figure 8:
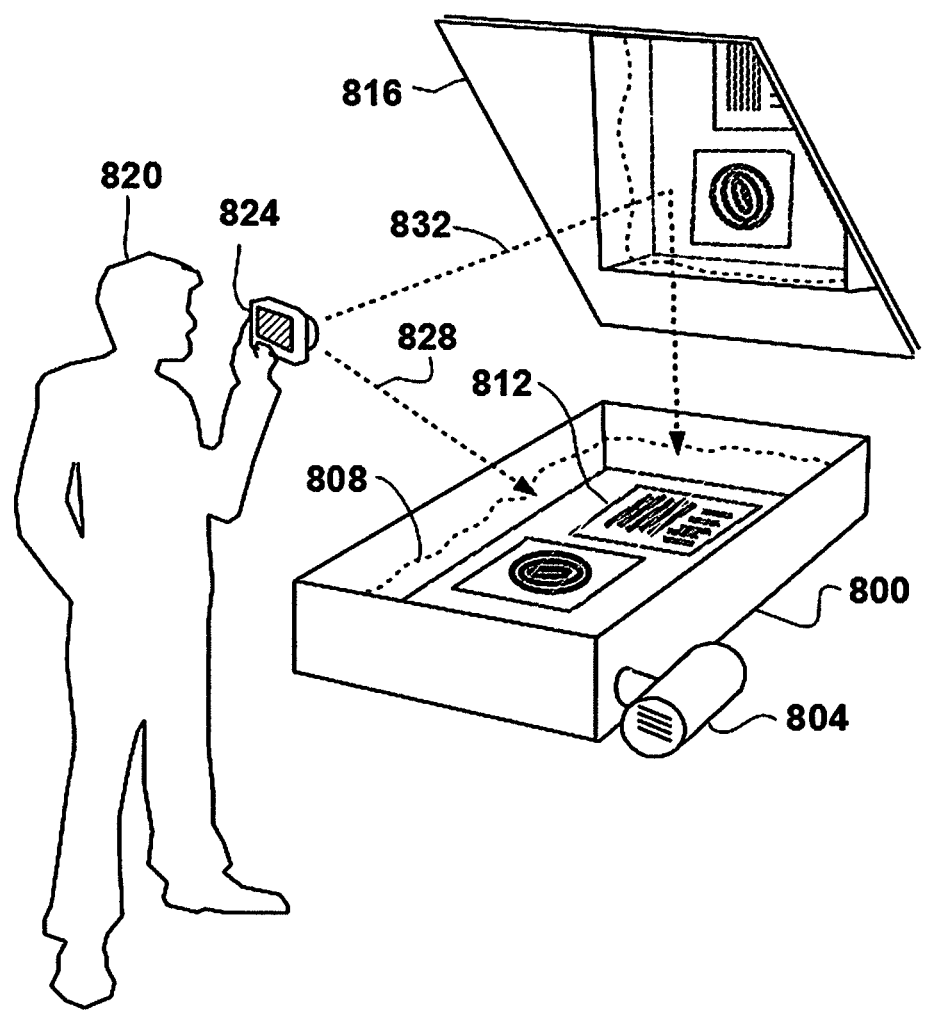
FIG. 8 is an illustration of a method to demonstrate an embodiment using generated fog.

FIG. 8 offers a method and device for demonstrating the benefits of a preferred embodiment. A container 800 that may be erected with walls and an open top includes an aperture accepting the output of a fog generator 804. The container can be filled with fog to a depth and density sufficient to obscure sample targets both passive and active displays 812 such as video screens. A mirror or other reflective surface such as metalized plastic film 816 is erected over the container 800 affording an observer 820 with an embodiment of the fog viewing device 824 both a direct view 828 and a longer range reflected view 832 of the aforementioned targets.

In summary the various embodiments of the inventive optical system limit the spectral pass band to one or more of the absorption bands of water. This has the effect of exploiting the physical properties of water such as the droplets of fog to reduce the amount of scattered light. Since scattered light combined with the limited dynamic range of photonic detectors is the primary contributor to loss of visibility in the presence of water vapor, the present embodiments produces improved visibility in fog. Finally the present embodiment modifies the electronic processor of the optical system to control the gain settings for the detectors to increase the contrast and visibility of objects of interest in the scene.

Details of the various embodiments have been described herein. However, the above-mentioned descriptions are intended for illustration only, and thus should not limit the scope of those embodiments. Various improvements and modifications can be performed without departing from the spirit and scope of the embodiments disclosed herein.

What is claimed is:

1. An apparatus, comprising:
    a camera having one or more lenses and a viewfinder;
        one or more band pass filters attached to at least one of the lenses and configured to block all wavelengths of available, natural light except for those corresponding to the absorption bands of water;
        a plurality of multilayer band pass filters having band limits chosen to ensure the shift in the pass band due to changes in the angle of incidence (AOI), so as to prevent the pass band being shifted out of the absorption band of water;

detector/amplifier circuitry having a predetermined dynamic range, for amplifying signals corresponding to the absorption bands of water;

an electronic monitor to display processed images of a plurality of scenes in a foggy environment, wherein the processed images have increased visibility; and the camera absorbing scattered light emanating from the scenes being viewed, thereby increasing visibility of objects of interest within the scenes as viewed through the electronic monitor.

2. The apparatus of claim 1, wherein the filters are located in front of the plurality of lenses.

3. The apparatus of claim 1, wherein the filters are located behind the plurality of lenses.

4. The apparatus of claim 1, wherein the filters are located between the plurality of lenses.

5. The apparatus of claim 1, wherein the filters are multi-layer filter coatings and are applied directly to the lenses.

6. The apparatus of claim 1, wherein the detector/amplifier are of a non-imaging type in which objects being detected are illuminated with natural (passive) or artificial (active) light sources.

7. The apparatus of claim 1, wherein the position and shape of the said filter is such that the amount of shift of the pass band for changing AOI is reduced from that produced by a flat filter.

8. The apparatus of claim 1, wherein the apparatus is configured to be mounted in a vehicle to provide the driver with improved viewing in fog.

9. The apparatus of claim 8, in which the camera observes the scene at the same viewing angle as the driver.

10. The apparatus of claim 8, in which the monitor is configured with an attached optical element to provide a collimated heads-up view of the scene to the driver.

11. The apparatus of claim 10, in which said optical element is further configured to compensate for distortions in the collimated view induced by curvature in the windshield.

12. The apparatus of claim 8, wherein the apparatus is configured for use in an aircraft.

13. The apparatus of claim 1, wherein the apparatus is configured to be mounted in a vehicle to provide a driver with improved viewing from the rear of the vehicle.

14. The apparatus of claim 13, in which the camera is configured to provide a scene from behind the vehicle.

15. The apparatus of claim 13, in which the rear-view mirror is configured with an embedded monitor to provide the driver with a view that matches the driver's direct view of the rear scene.

16. The apparatus of claim 1, wherein the apparatus is configured as a magnified optical sight.

17. The apparatus of claim 16, wherein the apparatus is configured as a rifle scope.

18. A device comprising:

a container erected with walls, n open top and an aperture for accepting the output of a fog generator;

a fog generator to fill the container with fog;

a camera having one or more lenses and a viewfinder;

a collection of sample patterns to be placed at the bottom of the container for demonstrating the benefits of an optical system to view through the fog;

the optical system further comprising one or more band-pass filters configured to block all wavelengths of available, natural light except for those corresponding to the absorption bands of water; and an electronic monitor to display processed images of a plurality of scenes in a foggy environment, wherein the processed images have increased visibility; and the camera absorbing scattered light emanating from the scenes being viewed, thereby increasing visibility of objects of interest within the scenes as viewed through the electronic monitor.

19. The device of claim 18, further comprising a reflecting surface positioned to provide a near-perpendicular view into the container.

20. The device of claim 18, further comprising additional lighting above the fog and on the sample patterns to simulate the effects of vehicle and external lighting.

* * * * *